United States Patent [19]

Kozakai

[11] 4,093,314

[45] June 6, 1978

[54] HYDRAULIC BRAKE PRESSURE CONTROL DEVICE

[75] Inventor: Asao Kozakai, Anjo, Japan

[73] Assignee: Aisin Seiki Kabushiki Kaisha, Kariya, Japan

[21] Appl. No.: 753,583

[22] Filed: Dec. 22, 1976

[30] Foreign Application Priority Data

Dec. 30, 1975  Japan .............................. 50-156968

[51] Int. Cl.² .............................................. B60T 8/24
[52] U.S. Cl. .................................................. 303/24 F
[58] Field of Search .................... 303/6 A, 6 C, 24 R, 303/22 R, 24 A, 24 F; 188/195 R, 349

[56] References Cited

U.S. PATENT DOCUMENTS

| | | | |
|---|---|---|---|
| 2,754,938 | 7/1956 | Gallay | 188/345 |
| 2,807,337 | 9/1957 | Starling | 188/349 |
| 3,035,869 | 5/1962 | Francia | 303/24 R X |
| 3,533,425 | 10/1970 | Hannan | 303/24 R X |
| 3,890,014 | 6/1975 | Hayes | 303/24 R |
| 3,932,002 | 1/1976 | Komoda et al. | 303/22 R |

Primary Examiner—George E. A. Halvosa
Attorney, Agent, or Firm—Finnegan, Henderson, Farabow & Garrett

[57] ABSTRACT

An improved brake pressure proportioning unit of the kind responsive to centrifugal force developed by a turning vehicle and having two separate weight-activated levers controlling the springs that determine the pressure reduction setpoints of two proportioning valves, utilizes a link to connect the separate levers outside the pressure boundaries for automatically equalizing the exerting forces of the springs and permitting manual adjustment of the biasing of the springs a like amount. Also, an improved brake pressure proportioning unit of the abovementioned kind uses a single weight and lever mechanism for equalizing the absolute magnitude of changes in the working length of both springs during a turn, the change in one spring being an increase and the change in the other being a decrease in working length.

6 Claims, 4 Drawing Figures

HYDRAULIC BRAKE PRESSURE CONTROL DEVICE

BACKGROUND OF THE INVENTION

1. Field of the Invention

This invention relates to a hydraulic brake pressure control device for vehicles and, more particularly, to an improved control device for preventing the inboard rear wheel of the vehicle from locking upon brake application during the turning of the vehicle.

2. Description of the Prior Art

Devices for controlling the hydraulic braking pressure to the brake cylinder of an inboard wheel of a turning vehicle to prevent locking upon application of the brakes are known in the art. Typical of such apparatus is that disclosed in U.S. Pat. No. 3,890,014 to Hayes. These devices are required to compensate for the shift in load-bearing to the outboard wheel during a turn and the resultant decrease in the braking force required to lock the inboard wheel. That is, when the vehicle turns, the load upon the inner wheel with respect to the turning direction is made smaller while the load upon the outer wheel is made larger due to the laterally acting centrifugal force. When the brake is applied in such a condition, the inner wheel would be subject to be locked without hydraulic brake pressure control. The locking of the inner wheel may cause over-steering of the vehicle wherein a slight operation of the steering wheel causes a disproportionately large turning of the vehicle. Such vehicle response can be objectionable, as the safety of the driver of the vehicle may be compromised.

The overall objects of this invention are substantially the same as those of U.S. Pat. No. 3,890,014. That is, according to the invention which is an improvement over devices such as shown in U.S. Pat. No. 3,890,014, the brake force of the right and left wheels may be controlled to prevent locking the inboard wheel of the vehicle upon application of the brakes during a turn.

One of the significant drawbacks to the brake pressure controllers of the type disclosed in Hayes is that minor variations in the spring constants and/or manufacturing tolerances of the valve housing will result in different setpoints for the two proportioning valves. Such differences can result in a tendency for one wheel to "lock" before the other during straight-ahead operation as well as to cause different handling characteristics during braking on a curve, depending on whether a right or left hand turn is being made.

Another significant drawback to conventional hydraulic braking pressure controllers used to compensate for lateral motion is that the springs used to establish the setpoints at which the braking pressure for a particular wheel cylinder will be reduced relative to the master cylinder pressure are positioned inside the pressure boundary as in Hayes or are located as to require complete disassembly of the valve components for gaining access thereto. That is, with present controllers, biasing adjustments to the setpoints can be made only after dismantling the proportioning valve assemblies and then re-assembling the devices using springs with different K factors or pre-loads. The time for such disassembly/assembly coupled with the care needed to properly seal a high pressure apparatus make adjustments to the valve setpoints prohibitively expensive if the present improvement is not utilized.

The present invention, to be disclosed in greater detail in the portion of the specification that follows, not only automatically equalizes the exerting force of the springs in both valves, and thereby the setpoints, but also permits manual biasing adjustments to be made in the spring force quickly and easily without disturbing high pressure seals. The present invention ensures that any such increase or decrease in reduced pressure setpoints is the same for each of the two valves, thus providing for uniform vehicle response and handling during braking regardless of whether a right or left hand curve is being negotiated.

Another problem with conventional rear wheel brake pressure proportioning devices that are responsive to lateral movement involves unwanted changes in the overall front-to-rear proportionment during braking while turning. Present devices do not ensure that the magnitude of increased spring force (increased setpoint) on the valve controlling the outboard wheel has the same magnitude as the decrease of the spring force (lowered setpoint) on the valve controlling hydraulic braking pressure to the inboard wheel. A balancing of these magnitudes is often desirable in order that the degree of proportioning for the rear wheels taken as a whole in respect to the rear-to-front weight shift during braking will remain fairly constant. The present invention is also intended to solve this problem by providing improvements to existing apparatus.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims.

SUMMARY OF THE INVENTION

To achieve the foregoing advantages and benefits and in accordance with the purpose of the invention, as embodied and broadly described herein, the invention comprises the improvement in a hydraulic brake system for vehicles including a master cylinder; two wheel brake cylinders located on opposite sides of the vehicle at the same point along the longitudinal axis of the vehicle in separate hydraulic communication with the master cylinder, the communications defining two pressure boundaries; and a brake pressure proportioning unit for reducing wheel brake pressure for master cylinder pressures greater than a predetermined setpoint, the unit having two proportioning valves, one valve interposed in each of the separate hydraulic communications; two springs each associated with a respective one of the proportioning valves for establishing the predetermined setpoint; wherein the improvement comprises means interacting with the springs for automatically equalizing the exerting forces of the springs.

As embodied herein, the interacting means is located outside the two pressure boundaries and permits manual adjustment of the biasing of the springs a like amount.

As also embodied herein, the brake pressure proportioning unit also includes two weights each movable in response to centrifugal force caused by the vehicle during a turn; and first and second lever means, each applying the force of a respective one of the weights upon a respective one of the springs, the first and second lever means being responsive to the movement of the respective weight for increasing the exerting force of the spring associated with the valve controlling the pressure to the brake cylinder outboard of the vehicle turning path and decreasing the exerting force of the spring associated with the valve controlling the inboard brake cylinder, and wherein the interacting means includes a link means connecting the first and second lever means. Preferably, the link means includes a spring element.

As embodied herein, and being another embodiment of the present invention, the interacting means comprises a single weight means responsive to the centrifugal force generated by the turning vehicle; and single lever means applying the force of the single weight means upon each of the springs for decreasing the working length of the spring associated with the valve controlling the braking pressure to the outboard wheel and increasing the working length of the other spring a like amount during the turn.

Preferably, in the latter embodiment, the axes of the proportioning valves are oriented parallel to the longitudinal axis of the vehicle and lie in the same horizontal plane, and the single lever means includes a single pivot located midway between the valve axes for providing pivoting motion in a horizontal plane, and a single "T" shaped lever member rotatably attached to the pivot at the junction of the crosspiece and stem of the "T", the pair of springs being individually tensioned by the arms of the crosspiece at points equidistant from the junction, the weight means being fixedly attached to the stem.

The accompanying drawings, which are incorporated in, and constitute a part of, the specification illustrate two embodiments of the invention and, together with the description, serve to explain the principles of the invention.

BRIEF DESCRIPTION OF THE DRAWING

FIG. 4 is a sectional view of a different embodiment of the present invention.

DESCRIPTION OF THE PREFERRED EMBODIMENTS

Reference will now be made in detail to the present preferred embodiments of the invention, examples of which are illustrated in the accompanying drawing.

Figure 1:
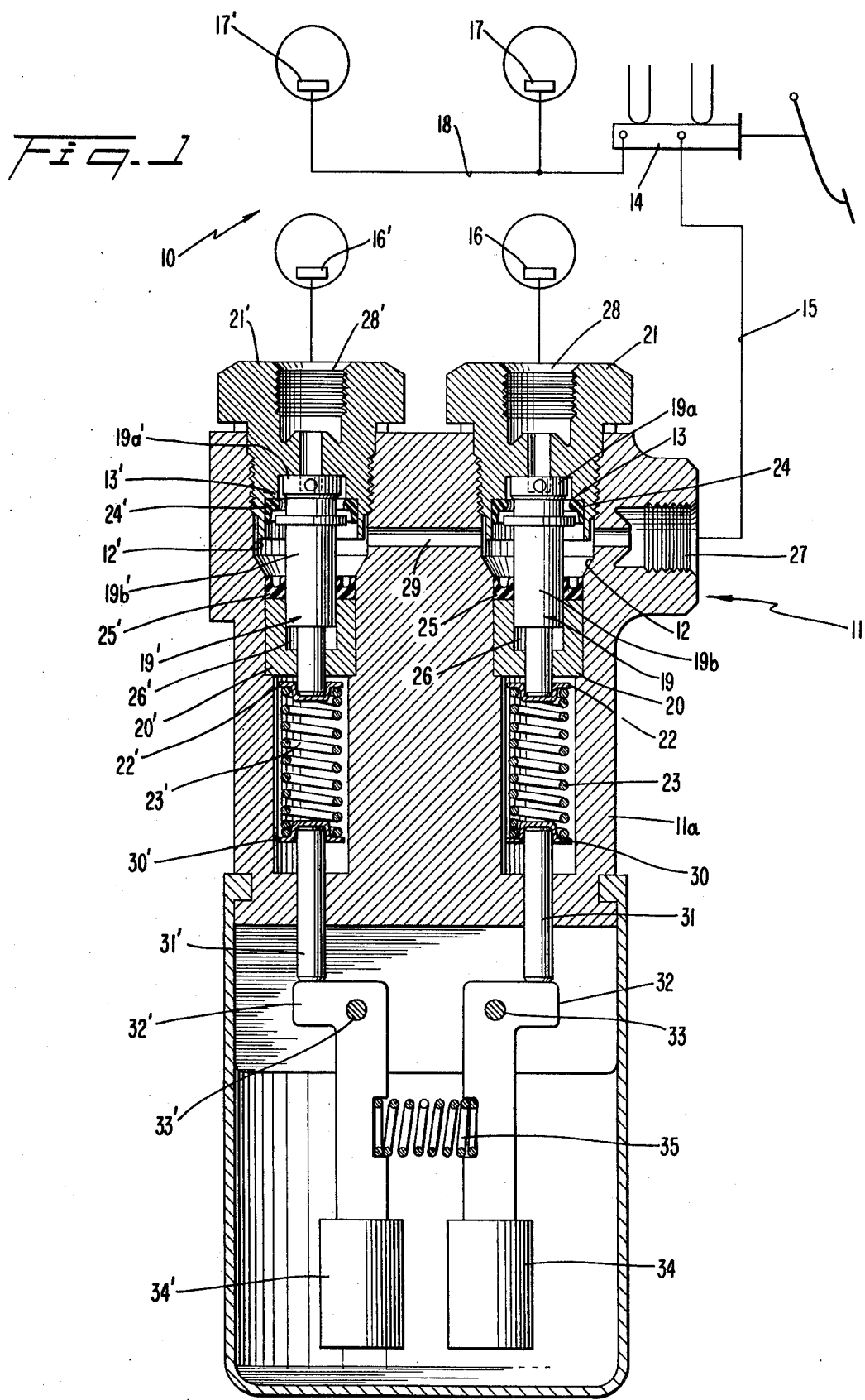
FIG. 1 is a sectional view of a hydraulic brake pressure control device according to the invention.

Referring now to FIG. 1, there is shown a hydraulic brake system 10 that includes a brake pressure proportioning unit 11 for reducing hydraulic brake pressure to a pair of wheel brake cylinders 16 and 16'. Although cylinders 16 and 16' will be described as being associated with the rear wheels of the vehicle, as a forward loading shift accompanies braking of conventional vehicles moving in the forward direction, this representation is not intended to limit in any way the scope of the present invention. Hence, the proportioning device may be used to control the front wheel cylinders for certain applications, and the only restriction is that one of the pair of controlled wheel brake cylinders be located on the opposite side of the vehicle from the other at the same location along the longitudinal axis of the vehicle.

Apparatus 10 is shown in FIG. 1 as having a proportioning unit 11 including a housing 11a. Within the proportioning unit 11 are provided two cylinders 12 and 12' in which two proportioning valves 13 and 13' are disposed. Hydraulic pressure from a tandem master cylinder 14 is applied to rear wheel cylinders 16 and 16' via conduit 15 and the proportioning valves 13 and 13'. Front wheel cylinders 17 and 17' are supplied directly from master cylinder 14 via conduit 18.

Operation of valve 13 will now be discussed, with the understanding that a description of the operation of vvalve 13' would be virtually identical were prime marks to be applied to the part numbers for valve 13.

A first piston 19 of the valve 13 is interposed between a guide member 20 fitted in the housing 11a and a plug 21. The piston 19 is urged to move so as to release a large diameter portion thereof 19a from a valve seat 24 by a spring 23 through retainer 22 during inactivation of the valve 13. Thus chamber 26 is formed and is sealed from the hydraulic pressures of the braking system by small diameter portion 19b and a sealing cup 25.

When the proportioning valve 13 is to be activated, the large diameter land 19a is brought to sealing engagement with the valve seat 24 in order to interrupt the fluidic communication between an inlet port 27 and an outlet port 28.

A fluid passage 29 is provided in the proportioning unit 11 to permit the fluid communication between two valves 19 and 19'. Passage 29 ensures that the pressure upstream of both valve assemblies will be the same.

In accordance with the invention, and continuing with the discussion of valve 13, spring 23 engages a retainer 30 to impart the exerting force delivered from lever 32 through a rod 31. The lever 32 is adapted to pivot around a pivot pin 33 and to be in camming relation with the end of rod 31. Weight 34 which will move in accordance with the lateral centrifugal force generated by a turning vehicle is fixedly attached to lever 32. Therefore, lever 32 pivots in response to the lateral movement of the weight 34 so as to increase or decrease the exerting force of the spring 23 through movement of rod 31 and retainer 30, thereby establishing a communication for applying the force generated by weight 34 upon spring 23.

The proportioning unit 11 of the hydraulic brake system 10 is provided with means outside the pressure boundary for interacting with springs 23 and 23' to automatically equalize the exerting forces of the springs. As embodied herein, the interacting means is a link means connecting levers 32 and 32', which levers can affect springs 23 and 23' through rods 31 and 31' and retainers 30 and 30' in the aforesaid manner. Preferably, the connecting link includes a spring 35 tensioned between the lever arms of levers 32 and 32' to exert equal but oppositely directed forces on the arms.

Inasmuch as spring 35 can be readily interchanged manually with a similar spring of a different length or a greater or lesser spring constant, the biasing force on the springs 23 and 23' can be varied. And, since spring 35 exerts the same force on each of the levers 32 and 32', the biasing of springs 23 and 23' will be equal for equal lever mechanical advantage factors.

It is also within the scope of the present invention to substitute a noncompressible element for spring 35. Such a noncompressible element could include a turnbuckle member. The length of the noncompressible element could be varied manually by activating the turnbuckle and thereby biasing the springs 23 and 23' by changing their working lengths.

When the vehicle is traveling in a straight line, that is, not negotiating a turn, the exerting force of the spring 35 is adapted to evenly balance with the forces of the springs 23 and 23'. It is noted that the two levers 32 and 32' are adapted to pivot in the same plane. Thus, when one of the levers 32 or 32' pushes one of the rods 31 or 31', the other lever pushes against the other rod with a like force by the action of connecting spring 35 acting on levers 32 and 32' through identical moment arms "Y" (see FIG. 3).

In operation, when the vehicle is in the straight running condition wherein no lateral centrifugal force is generated upon braking, the exerting forces of three springs 23, 23' and 35 are balanced. When the brake is applied, both proportioning valves 13 and 13' are actuated above the same predetermined value of the master cylinder pressure as determined by springs 23, 23' and 35 so that the brake pressure characteristic will be as illustrated by line A of FIG. 2.

Figure 2:
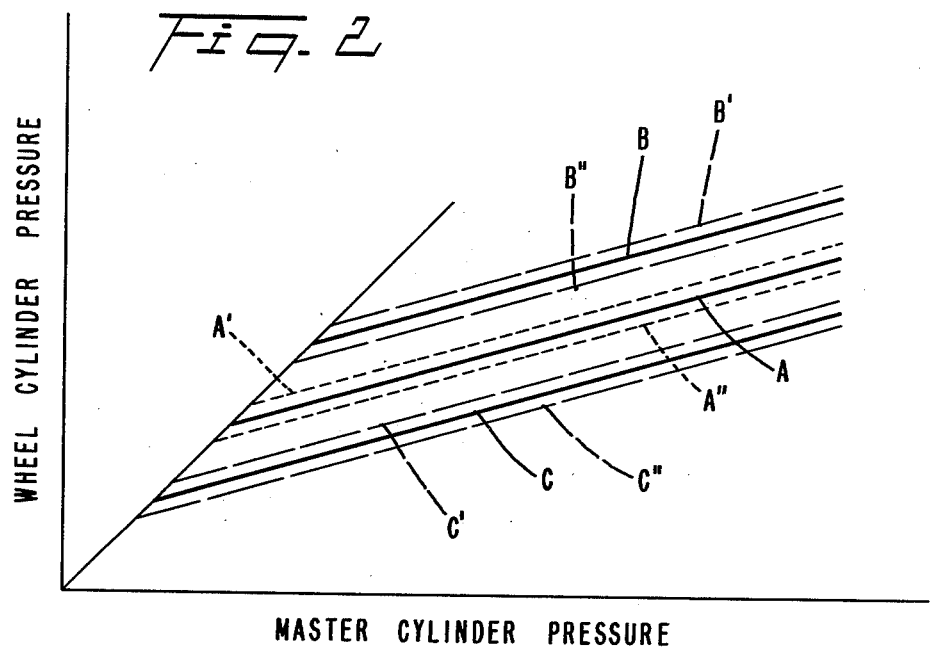
FIG. 2 is a diagram showing brake pressure characteristics of the vehicle wheels versus master cylinder pressure during operation of the device shown in FIG. 1.

If, through experimentation, the spring 35 preload is incorrect for proper vehicle handling in respect to the back-to-front loading shift, a stronger spring can be easily substituted to raise the setpoint to achieve the characteristic A' in FIG. 2 or a weaker spring inserted to obtain performance according to A". Changes in static vehicle weight distribution also may occasion substitution of stronger or weaker springs for spring element 35.

When the vehicle turns right, the weights 34 and 34' are moved left by the action of centrifugal force to rotate the lever members 32 and 32' about the pins 33 and 33' in the clockwise direction. Accordingly, the rod 31 is released against the force of spring 23 while the rod 31' further compresses spring 23' so that the exerting force of spring 23' on piston 19 is strengthened. If the brake is applied in this condition and the master cylinder pressure overcomes the exerting force of the spring 23, the brake pressure characteristic of the right rear wheel cylinder 16 will be as shown by the line C of FIG. 2, and the brake pressure characteristic of the left rear wheel cylinder 16' will be as shown by the line B of FIG. 2. A comparison of lines C and B of FIG. 2 indicates that a higher hydraulic pressure will be available to the outboard, left rear wheel cylinder 16 to accommodate the increase wheel loading while the hydraulic pressure supplied to the inboard, right rear wheel cylinder 16' is reduced to prevent locking.

For turning operation with the proportioning unit 11 incorporating a stronger spring at spring element 35, the characteristic curves at B' and C' will be in effect. During braking while turning with a weaker spring 35, the braking system will behave according to curves B" and C" which correspond to the reduced no-turn setpoint A". In this manner, the static biasing for straight-ahead braking accomplished by spring 35 is carried through to the quasi-static operation during a turn.

Figure 3:
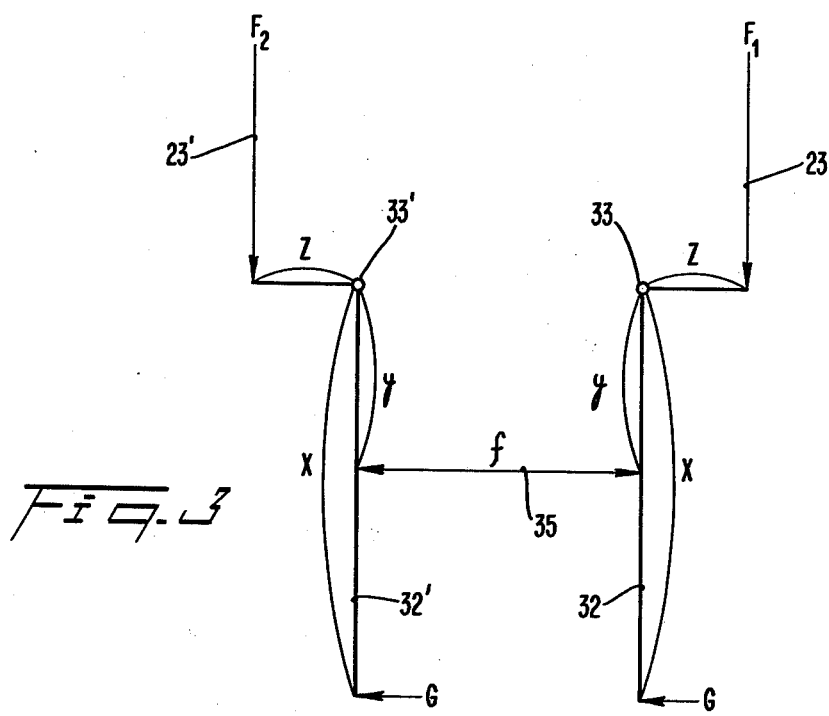
FIG. 3 is a diagram for explanation of an operation of the embodiment of the invention shown in FIG. 1.
Figure 1:
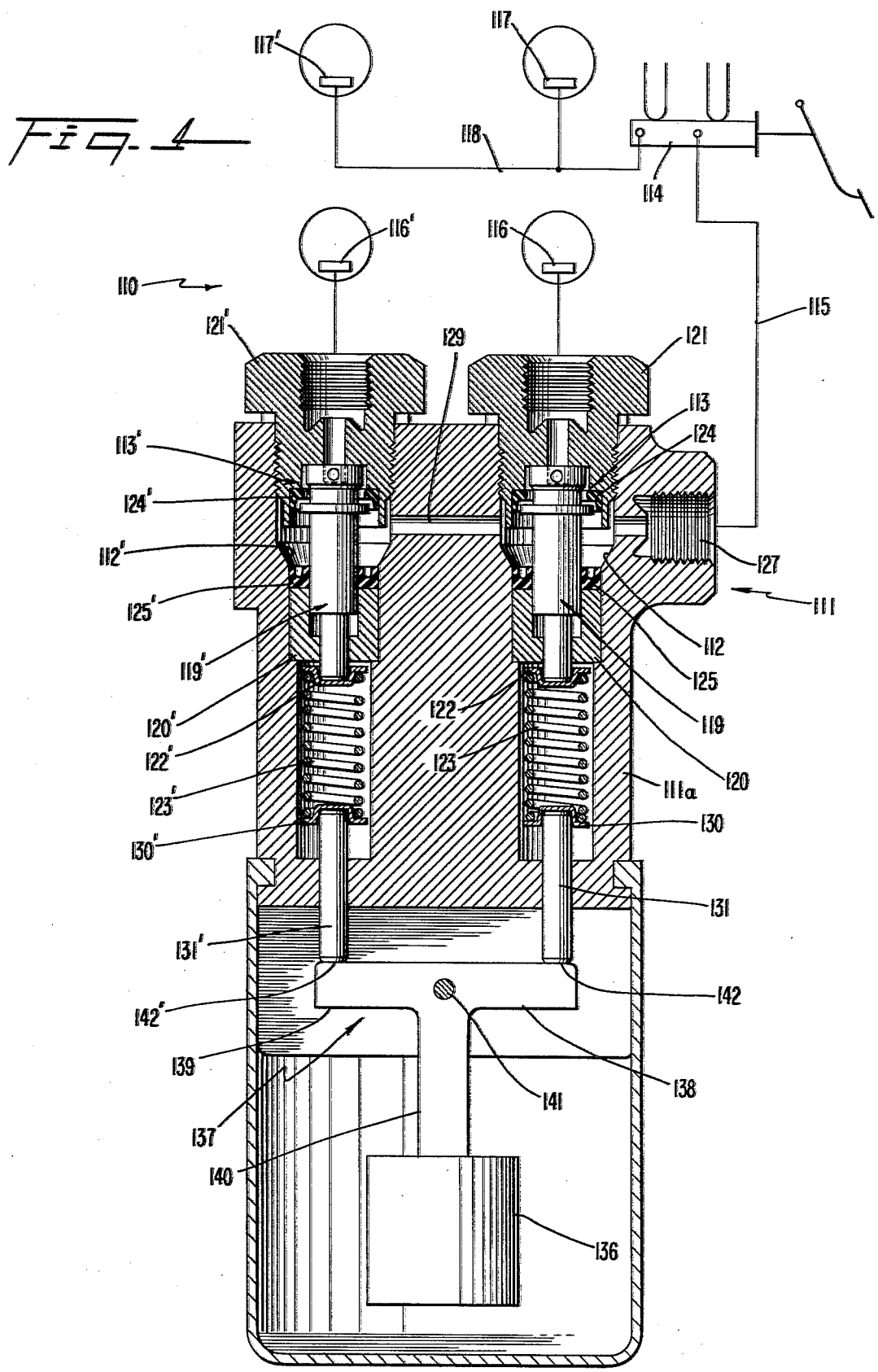

FIG. 3 shows schematically an explanation of the above-mentioned operation. In FIG. 3, $F_1$ is the exerting force of spring 23, $F_2$ is the force for spring 23', $f$ is the exerting force of spring 35, $z$ is the distance between the pivot pin 33 or 33' and the contacting point of the rod 31 or 31' with the link 32 or 32', $y$ is the distance between the pin 33 or 33' and the spring 35, and $x$ is the distance between the pin 33 or 33' and the weight 34 or 34'. Usually, for straight-ahead operation, $$F_1 = fy/z = F_2$$

demonstrating that the present invention will equalize the exerting forces of springs 23 and 23'. When the left-directed lateral centrifugal force G is applied to the weights 34 and 34', such as during a right-hand turn, $$F_2 = (fy + Gx)/z$$

at the link associated with the outer rear wheel and $$F_1 = (fy - Gx)/z$$

at the link associated with the inner rear wheel. Thus, the exerting force of the springs 23 and 23' is varied so as to balance with the centrifugal force. As a consequence, the pressure reducing setpoint of the proportioning valve is higher at the outer rear wheel brake and lower at the inner rear wheel brake as illustrated by the lines B and C of FIG. 2.

Referring now to another embodiment of the present invention as is depicted in FIG. 4, there is shown a hydraulic brake system 110 including a brake pressure proportioning device 111 that is responsive to centrifugal force generated by the lateral motion of a vehicle negotiating a turn. The components of the proportioning device shown in FIG. 4 are arranged substantially similarly to, and cooperate substantially in the same manner as corresponding elements of the embodiment in FIG. 1 (i.e., those having part numbers differing by exactly 100), with the following exceptions.

In accordance with the invention, a single weight 136 is provided in conjunction with a single lever assembly 137 connecting weight 136 with springs 123 and 123' through rods 131 and 131' for decreasing the working length of the spring associated with the valve controlling the braking pressure to the outboard side of a turning vehicle and increasing the working length of the other spring a like amount during a turn.

As herein embodied, the single lever assembly 137 includes a "T"-shaped member 138 having a cross-piece 139 and a stem 140 to which weight 136 is fixedly attached. The "T"-shaped member 138 is rotatably supported at the junction of cross-piece 139 and stem 140 by a pivot 141. Pivot 141 is located midway between the axes of valves 113 and 113', and springs 123 and 123' are each tensioned through rods 131 and 131' by cross-piece 139 at points 142 and 142' which are equidistant from the location of pivot 141. Cross-piece 139 provides camming movement to rods 131 and 131' in response to movement of the "T"-shaped member 138 as a result of a laterally directed centrifugal force acting on weight 136. Forces generated by the single weight 136 are thereby applied to both of springs 123 and 123'.

The above-described single lever arrangement for the adjustment of proportioning valves 113 and 113' ensures that deflections in the working length of springs 123 and 123' caused by movement of rods 131 and 131' will be equal. Since the spring constants for springs 123 and 123' are substantially linear for small deflections, the increase in the exerting force of spring 123' will be substantially equal to the decrease in the exerting force of spring 123 for clockwise movement of lever 138 about pivot 141. For counter-clockwise movement about pivot 141, the direction of the changes in the working lengths will be reversed, but the absolute magnitude of the decrease and the increase in the working lengths of the respective springs will be equal.

It will be apparent to those skilled in the art that various modifications and variations could be made in the apparatus and process of the invention without departing from the scope or spirit of the invention.

What is claimed is:

1. In an hydraulic brake system for a vehicle including a master cylinder, two wheel brake cylinders located on opposite sides of the vehicle at the same point along the longitudinal axis of the vehicle in separate hydraulic communication with the master cylinder, the communication defining two pressure boundaries, a brake pressure proportioning unit for supplying equal reduced braking pressure to both brake cylinders during straight-ahead vehicle motion and proportioned reduced braking pressure to the brake cylinders during lateral vehicle motion, said reduced pressures being relative to the master cylinder pressure, the unit having (i) two proportioning valves, one valve interposed in each of the separate hydraulic communications for supplying reduced wheel brake pressure to the respective wheel cylinder for master cylinder pressure greater than a predetermined valve setpoint, (ii) two springs each associated with a respective one of the proportioning valves, each of the springs being biased, the respective predetermined setpoint being established by the exerting force of the respective one of the biased springs, (iii) two weights each movable in response to centrifugal force caused by the lateral motion of the vehicle during a turn, and (iv) first and second lever means each applying the force of a respective one of the weights upon one of the springs, the first and second lever means being responsive to the movement of the respective weight for increasing the spring exerting force and the setpoint of the valve supplying reduced pressure to the brake cylinder outboard of the vehicle turning path and decreasing the spring exerting force and the setpoint of the valve supplying reduced pressure to the inboard brake cylinder relative to the respective predetermined setpoints with no lateral vehicle motion, the improvement comprising mechanical link means interacting between the springs for automatically equalizing the exerting forces of the springs and the valve setpoints in the absence of lateral vehicle motion, said link means connecting the first and second lever means.

2. The apparatus of claim 1 wherein said interacting means is located outside said two pressure boundaries and wherein said interacting means permits manual adjustment of the biasing of the springs a like amount.

3. The apparatus of claim 2 wherein said link means includes a spring element.

4. A brake pressure proportioning unit for use in an hydraulic brake system for vehicles including a master cylinder, two wheel brake cylinders located on opposite sides of the vehicle at the same point along the longitudinal axis of the vehicle in separate hydraulic communication with the master cylinder, the communications defining two pressure boundaries, the unit supplying equal reduced braking pressure to both brake cylinders during straight-ahead vehicle motion and proportioned reduced braking pressure to the brake cylinders during lateral vehicle motion, said reduced pressures being relative to the master cylinder pressure, the unit comprising (a) two proportioning valves, one valve interposed in each of the separate hydraulic communications for supplying reduced wheel brake pressure to the respective wheel cylinder for master cylinder pressure greater than a predetermined valve setpoint;

(b) two springs each associated with a respective one of the proportioning valves, each of the springs being biased, the respective predetermined setpoint being established by the exerting force of the respective one of the biased springs;

(c) two weights each movable in response to centrifugal force caused by the lateral motion of the vehicle during a turn;

(d) first and second lever means each applying the force of a respective one of the weights upon one of the springs, the first and second lever means being responsive to the movement of the respective weight for increasing the spring exerting force and the setpoint of supplying reduced pressure to the brake cylinder outboard of the vehicle turning path and decreasing the spring exerting force and the setpoint of the valve supplying reduced pressure to the inboard brake cylinder relative to the respective predetermined setpoints with no lateral vehicle motion; and (e) mechanical link means attached to said first and second lever means outside the respective pressure boundaries, said mechanical link means for automatically equalizing the exerting forces of said springs and the valve setpoints in the absence of lateral vehicle motion and for permitting manual adjustment of the biasing of both of the two springs a like amount, said mechanical link means including a spring element.

5. In an hydraulic brake system for a vehicle including a master cylinder, two wheel brake cylinders located on opposite sides of the vehicle at the same point along the longitudinal axis of the vehicle in separate hydraulic communication with the master cylinder, the communication defining two pressure boundaries, a brake pressure proportioning unit for supplying equal reduced braking pressure to both brake cylinders during straight-ahead vehicle motion and proportioned reduced braking pressure to the brake cylinders during lateral vehicle motion, said reduced pressures being relative to the master cylinder pressure, the unit having (i) two proportioning valves, one valve interposed in each of the separate hydraulic communications for supplying reduced wheel brake pressure to the respective wheel cylinder for master cylinder pressure greater than a predetermined valve setpoint, (ii) two springs each associated with a respective one of the proportioning valves, each of the springs being biased, the respective predetermined setpoint being established by the exerting force of the respective one of the biased springs, the improvement comprising mechanical link means interacting between the springs for automatically equalizing the exerting forces of the springs and the valve setpoints in the absence of lateral vehicle motions, said mechanical link means including (a) single weight means responsive to the centrifugal force generated by the lateral motion of the turning vehicle; and (b) single lever means applying the force of said single weight means upon each of the springs for decreasing the working length of the spring associated with the valve controlling the braking pressure to the outboard wheel and increasing the working length of the other spring a like amount during the turn.

6. The apparatus of claim 5 wherein the axes of the proportioning valves are oriented parallel to the longitudinal axis of the vehicle and lie in the same horizontal plane, and wherein said single lever means includes
 (a) a single pivot located midway between the valve axes for providing pivoting motion in a horizontal plane; and
 (b) a single "T"-shaped lever member rotatably attached to said pivot means at the junction of the cross-piece and stem of the "T", the pair of springs being individually tensioned by the arms of the cross-piece at points equidistant from the junction, said weight means being fixedly attached to the stem.

* * * * *

UNITED STATES PATENT AND TRADEMARK OFFICE
CERTIFICATE OF CORRECTION

PATENT NO. : 4,093,314
DATED : June 6, 1978
INVENTOR(S) : Asao Kozakai

It is certified that error appears in the above–identified patent and that said Letters Patent are hereby corrected as shown below:

Claim 4:

Column 8, line 16, insert --the valve-- after "of".

Signed and Sealed this

Seventh Day of November 1978

[SEAL]

Attest:

RUTH C. MASON
*Attesting Officer*

DONALD W. BANNER
*Commissioner of Patents and Trademarks*